United States Patent [19]

Ball

[11] Patent Number: 4,707,768
[45] Date of Patent: Nov. 17, 1987

[54] RETAINER ASSEMBLY

[75] Inventor: Daniel A. Ball, Anderson, Ind.

[73] Assignee: General Motors Corporation, Detroit, Mich.

[21] Appl. No.: 900,370

[22] Filed: Aug. 26, 1986

[51] Int. Cl.$^4$ .............................................. B60Q 1/06
[52] U.S. Cl. ....................................... 362/66; 362/289
[58] Field of Search .................... 362/61, 66, 80, 273, 362/289

[56] References Cited

FOREIGN PATENT DOCUMENTS 688969  6/1964  Canada .................................. 362/61
2916225 11/1979 Fed. Rep. of Germany ........ 362/61

Primary Examiner—Samuel Scott
Assistant Examiner—Noah Kamen
Attorney, Agent, or Firm—Edward J. Biskup

[57] ABSTRACT

A retainer assembly for a composite headlamp that includes a body portion formed with a cavity which accommodates a lock member having a key hole shaped opening for capturing and preventing longitudinal movement of one end of an adjustment screw while allowing the adjustment screw to be rotated to permit repositioning of the headlamp about an aiming axis.

2 Claims, 4 Drawing Figures

RETAINER ASSEMBLY

FIELD OF THE INVENTION

This invention concerns composite headlamps and more particularly relates to a retainer assembly adapted to be fixed to composite headlamp and serve as a connector for the adjustment screw which adjustable positions the headlamp about an aiming axis.

SUMMARY OF THE INVENTION

More specifically the invention concerns a composite headlamp mounted in a support bracket for adjustable pivotable movement about a pair of substantially perpendicular aiming axes. In order to adjustably position the headlamp about each of the aiming axes, a first adjustment screw and a second adjustment screw are carried by the support bracket and each has one end thereof provided with a head configured so as to allow a tool to normally rotate each adjustment screw. The other end of one of the adjustment screws, and specifically the first adjustment screw, is formed with a reduced annular neck adapted to be connected to a retainer assembly fixed to the reflector of the headlamp. In the preferred form, the retainer assembly includes a central body portion having a cavity formed therein that defines a pair of axially spaced forward and rear walls. Each of the walls is formed with a circular aperture the center of which is located along an axis coincidental with the rotational axis of the first adjustment screw to allow the other end of the latter to be received within the aforementioned apertures with the annular neck portion located between the forward and rear walls of the central body portion. A pair of arms extend laterally outwardly from opposed sides of the central body portion and serve to fasten the retainer assembly to the headlamp. In addition, a locking member is provided that is inserted into the cavity of the central body portion for engaging the annular neck of the first adjustment screw and preventing longitudinal movement thereof relative to the body portion of the retainer assembly while allowing the first adjustment screw to be rotated to permit adjustable repositioning of the headlamp about one of the pair of aiming axes.

The objects of the present invention are to provide a new and improved retainer assembly for facilitating the connection and disconnection of an adjustment screw to and from a composite headlamp; to provide a new and improved retainer assembly for a composite headlamp that has a body portion formed with a pair of opposed mounting arms located in parallel offset planes for fastening the retainer assembly to the headlamp; and to provide a new and improved retainer assembly for a composite headlamp that includes a lock member insertable within a cavity for preventing longitudinal movement of an adjustment screw while allowing the adjustment screw to be rotated so as to permit repositioning of the headlamp about an aiming axis.

BRIEF DESCRIPTION OF THE DRAWINGS

Other objects and advantages of the present invention will be apparent from the following detailed description when taken with the drawings in which.

DESCRIPTION OF THE PREFERRED EMBODIMENT

Figure 1:
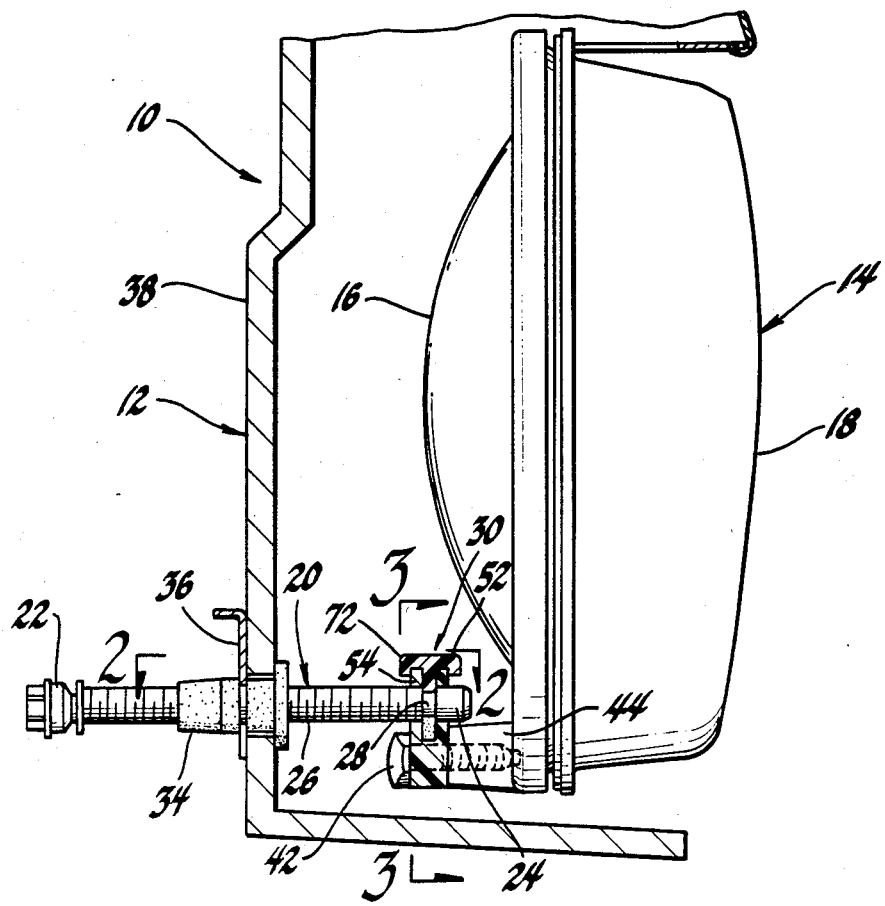
FIG. 1 is a side elevational view showing a composite headlamp combined, with a retainer assembly according to the present invention.

Referring now to the drawings and more particularly FIG. 1 thereof, a headlamp assembly 10 is shown in elevation mounted within a support bracket 12 in a manner so as to provide adjustment of the headlamp body 14 about a vertical aim axis and a horizontal aim axis. The headlamp body 14 is of the composite type having a replaceable bulb (not shown) located within a plastic reflector 16 the front end of which is closed by a glass or plastic lens 18. The headlamp assembly 10 is supported by the support bracket 12 in a conventional manner that includes a three point suspension two points of which include an adjustment screw for permitting adjustment of the headlamp body 14 about the aforementioned vertical aim axis and horizontal aim axis. In this case, only one of the adjustment screws can be seen in the drawings and is identified by the reference numeral 20. The adjustment screw 20 has its rear end formed with a head 22 configured so as to allow a TORX tool to rotate the screw 20 about its longitudinal center axis and cause the other end 24 of the screw 20 to selectably move to the right or to the left for adjusting the headlamp body 14 about one of the aforementioned aim axes. The shaft portion 26 of the screw 20 is threaded along substantially its entire length while the end 24 is formed with a reduced annular neck 28 (seen in FIG. 4) adapted to be connected to the headlamp reflector 16 through a retainer assembly 30 made of plastic. The adjustment screw 20 is received within a threaded bore 32 formed in a plastic nut 34 secured by a lock clip 36 to the back wall 38 of the support bracket 12. Thus, the threaded shaft portion 26 of the adjustment screw 20 is in threaded engagement with the threads of the bore 32 so that the aforementioned rotation of the screw 20 results in the aforedescribed longitudinal movement.

Figure 4:
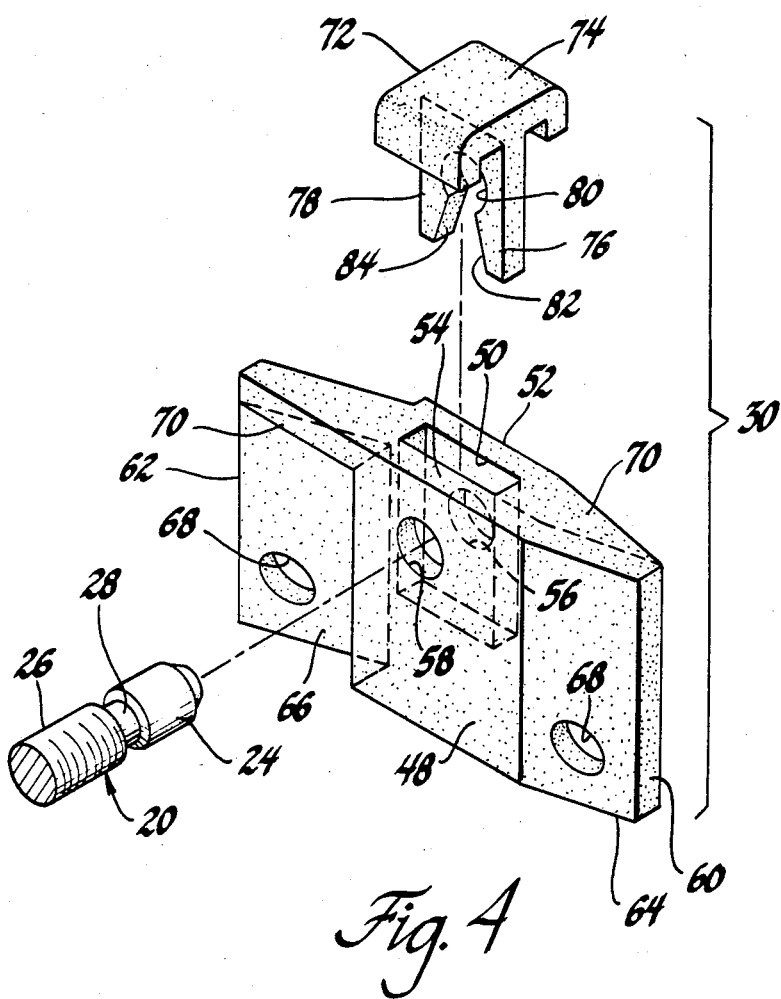
FIG. 4 is an isometric view of the retainer assembly seen in FIGS. 1-3.

As aforementioned, the end 24 of the adjustment screw 20 is mounted for rotation within the retainer assembly 30 which, in turn, is secured by a pair of identical screws 40 and 42 to a pair of identically angled studs 44 and 46 which extend outwardly from and are integrally formed with the reflector 16. In the preferred form, the retainer assembly 30 includes a generally rectangular body portion 48 having a vertically orientated rectangular cavity 50 formed therein so as to define axially spaced forward wall 52 and rear wall 54. The respective walls 52 and 54 are formed with axially aligned and identically sized circular apertures 56 and 58 which as seen in FIG. 4 are adapted to receive the end of the adjustment screw 20. A pair of arms 60 and 62 extend laterally outwardly from the opposed sides of the body portion 48 and each arm 60 and 62 is defined by parallel planar surfaces 64 and 66 and has an aperture 68 extending therethrough for receiving the associated screw 40 or 42 for securing the retainer assembly 30 to the studs 44 and 46 to the reflector 16. As shown the arms 60 and 62 are located in parallel and offset planes which intersect the rotational axis of the adjustment screw 20, and each has its top portion integrally formed with a web 70 which connects to the side of the body portion 48.

Figure 2:
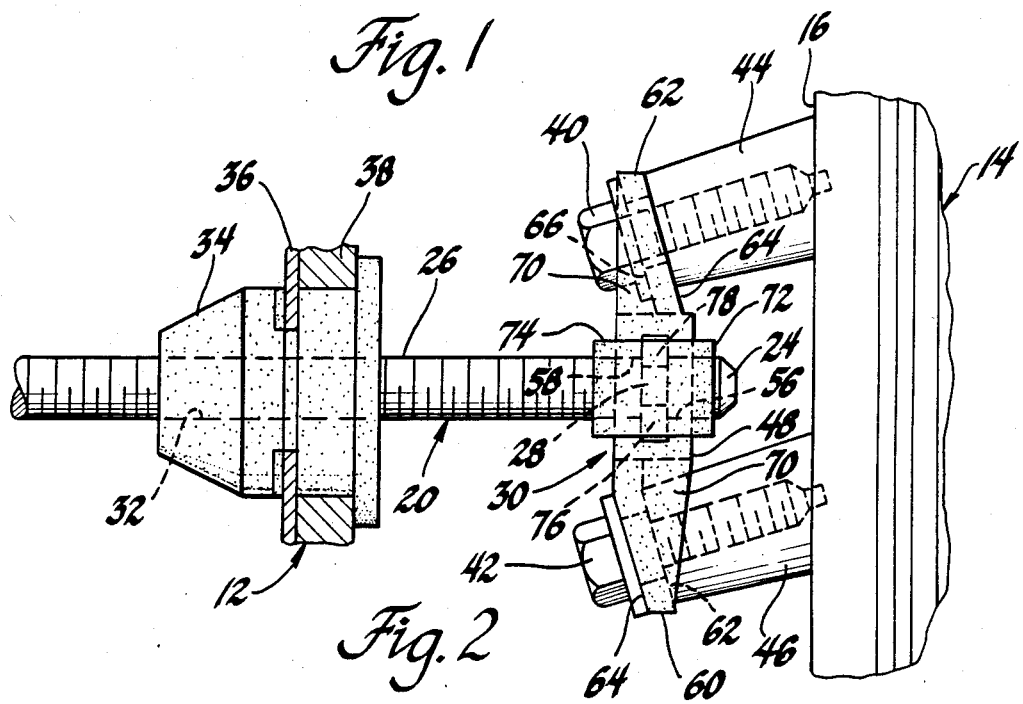
FIG. 2 is an enlarged plan view of the retainer assembly taken on line 2—2 of FIG. 1.
Figure 3:
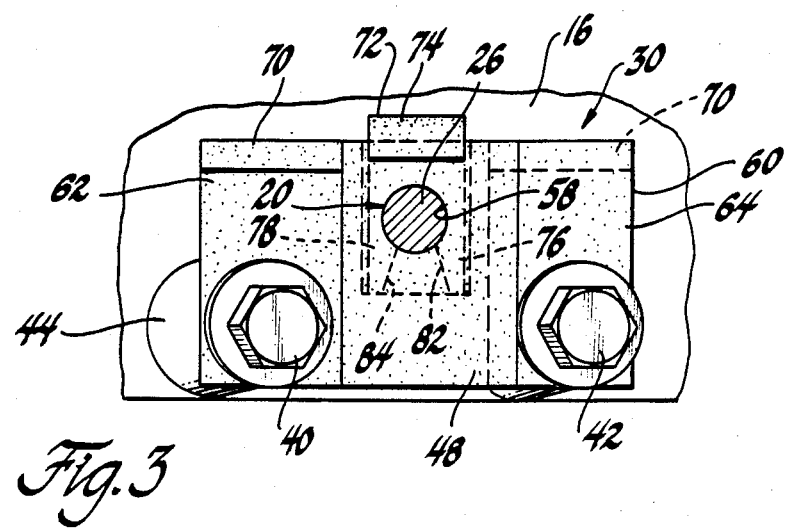
FIG. 3 is an enlarged view of the retainer assembly taken on line 3—3 of FIG. 1.

As seen in FIGS. 1, 2 and 3 when the end 24 of the adjustment screw 20 is combined with the retainer assembly 30 the end 24 is located within the cavity 50 with the neck 28 positioned between the front wall 52 and rear wall 54. To lock the adjustment screw 20 to the body portion 48 of the retainer assembly 30, a locking member 72 is provided, which as seen in FIG. 1, is generally T-shaped in cross section. The lock member 72 is also made of a plastic material and includes an inverted U-shaped head 74 and a pair of depending legs 76 and 78 which are formed so as to define a key hole shaped opening. As seen in FIG. 4, the diameter of the circular portion 80 of the opening is essentially the same as the diameter of the neck 28 of the adjustment screw 20. Also, the circular opening 80 connects with outwardly angled surfaces 82 and 84 provided on the legs 76 and 78 that initially engage the neck 28 when the legs 76 and 78 are inserted into the cavity 30. It will also be noted that as seen in FIG. 3 the distance between the outer sides of the legs 76 and 78 is less than the width of the cavity 50. Thus, once the end 24 of the adjustment screw 20 is properly located within the body portion 48 and the locking member 72 is inserted into the cavity 50, the legs 76 and 78 of the locking member 72 will initially flex outwardly and then flex inwardly to capture the neck 28 of the adjustment screw 20 as seen in FIGS. 1, 2 and 3. In addition, as seen in FIG. 1, the head 74 of the lock member 72 is shaped and sized so as to have a snug fit with the top of the walls 52 and 54. Similarly, the width of the legs 76 and 78 is sized, as seen in FIG. 1, to snugly fit into the cavity 50 and around the neck 28 to prevent any relative longitudinal movement between the end 24 of the adjustment screw 20 and the retainer assembly 30 while allowing relative rotation of the adjustment screw 20.

Various changes and modifications can be made in this construction without departing from the spirit of the invention. Such changes and modifications are contemplated by the inventor and he does not wish to be limited except by the scope of the appended claims.

The embodiments of the invention in which an exclusive property or privilege is claimed are defined as follows:

1. In combination with a headlamp mounted in a support bracket, an adjustment screw carried by said support bracket for selectively moving said headlamp, one end of said adjustment screw having head means configured for operational engagement with a tool by which the screw is rotated, the other end of said adjustment screw being formed with a reduced annular neck, a retainer assembly fixed to said headlamp for connecting said other end of said adjustment screw to said headlamp, said retainer assembly including a central body portion having an cavity formed therein so as to define a pair of axially spaced forward and rear walls, each of said walls having a circular aperture formed therein along an axis coincidental with the rotational aixs of said adjustment screw, said other end of said adjustment screw to be received within each of said apertures with said neck located between said walls, a pair of arms extending laterally outwardly from opposed sides of said body portion, said arms adapted to be secured to said headlamp, and a lock member adapted to be inserted into said cavity for preventing longitudinal movement of said adjustment screw relative to said body portion, said neck rotatably secured thereto whereby said other end of said adjustment screw can be rotated so as to cause adjustable pivotable repositioning of said headlamp.

2. In combination with a headlamp mounted in a support bracket, an adjustment screw carried by said support bracket for selectively moving said headlamp, one end of said adjustment screw having head means configured for operational engagement with a tool by which the screw is rotated, the other end of said adjustment screw being formed with a reduced annular neck, a retainer assembly fixed to said headlamp for connecting said other end of said adjustment screw to said headlamp, said retainer assembly including a central body portion having a cavity formed therein so as to define a pair of axially spaced forward and rear walls, each of said walls having a circular aperture formed therein along an axis coincidental with the rotational axis of said adjustment screw, said other end of said adjustment screw to be received within each of said apertures with said neck located between said walls, a pair of arms extending laterally outwardly from opposed sides of said body portion, said arms adapted to be secured to said headlamp, and a lock member having an inverted U-shaped head and a pair of legs dependng therefrom and shaped so as to define a key-hole opening therebetween, said lock member adapted to have its legs inserted into said cavity for capturing said neck and preventing longitudinal movement of said adjustment screw relative to body portion, said neck rotatably secured thereto whereby said other end of said adjustment screw can be rotated so as to cause adjustable pivotable repositioning of said headlamp.

* * * * *